United States Patent [19]
Rymes

[11] 3,780,371
[45] Dec. 18, 1973

[54] ELECTRONIC COUNTER-COUNTERMEASURES SYSTEM

[75] Inventor: William H. Rymes, Arlington, Va.

[73] Assignee: The United States of America as represented by the Secretary of the Navy, Washington, D.C.

[22] Filed: July 28, 1969

[21] Appl. No.: 846,310

[52] U.S. Cl............ 343/18 E, 313/92 PF, 343/5 CD
[51] Int. Cl............................ G01s 7/26, H01j 29/26
[58] Field of Search .............. 343/5 CD, 17.1, 18 E; 313/92 PF

[56] References Cited
UNITED STATES PATENTS

| | | | |
|---|---|---|---|
| 2,901,747 | 8/1959 | Sunstein | 343/5 CD |
| 3,114,907 | 12/1963 | Luftman et al. | 343/5 CD |
| 3,307,142 | 2/1967 | Doebler | 343/5 CD |
| 3,439,208 | 4/1969 | Gallaro et al. | 313/92 PF |

FOREIGN PATENTS OR APPLICATIONS

| | | | |
|---|---|---|---|
| 615,812 | 1/1949 | Great Britain | 313/92 PF |

Primary Examiner—Malcolm F. Hubler
Attorney—Edgar J. Brower and Thomas O. Watson, Jr.

[57] ABSTRACT

A countermeasure for confusion type electronic countermeasure techniques, when such countermeasures are used to jam radar detection of a relatively stationary target, is disclosed. By use of a two-color two-persistence cathode ray tube display, the target will appear in a color sharply contrasting from the color display of the jamming noise, thereby allowing for an effective determination of target range.

1 Claim, 2 Drawing Figures

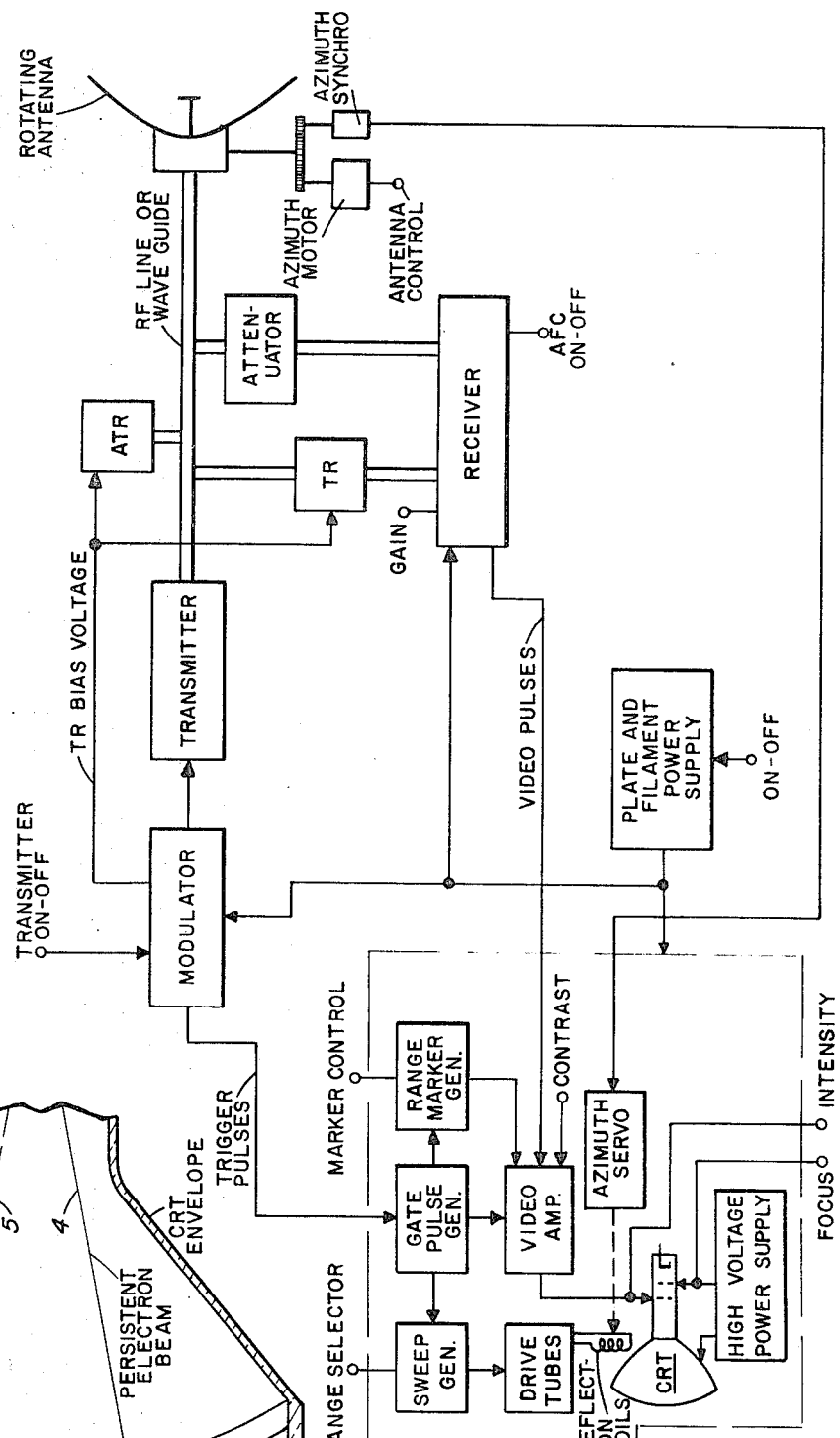
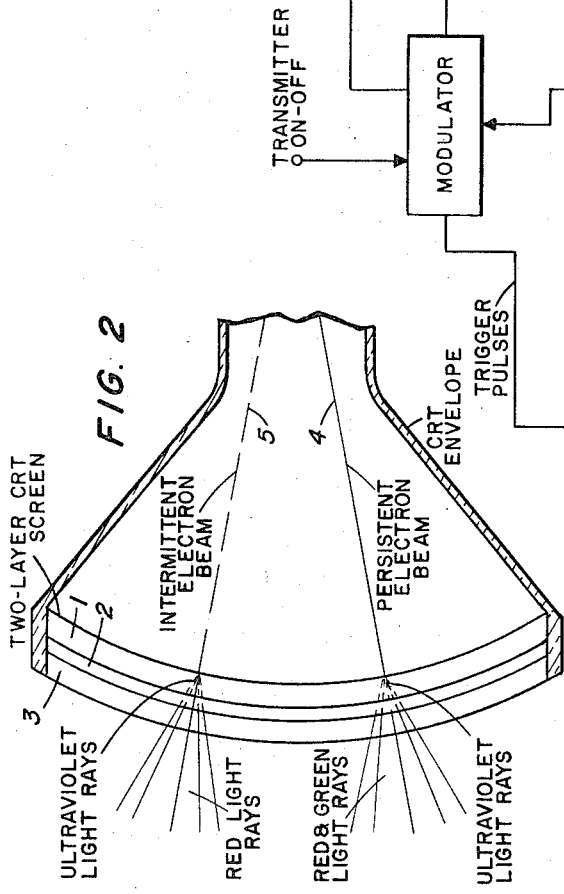

ELECTRONIC COUNTER-COUNTERMEASURES SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a system for displaying radar information and, more particularly, relates to a radar information display which will allow for effective determination of target range in the presence of jamming techniques.

Electronic interference with radar performance is called electronic countermeasures (ECM) and is generally of two classes, confusion class and deception class. The confusion class of countermeasure system is of the type that tries to hide the target being tracked by cluttering the radar display. The deception class of countermeasure system, on the other hand, presents false radar signals that appear as targets on the display. Of the two, the most popular and effective electronic countermeasure is the confusion class in which white gaussion noise signals covering the bandwidth of the radar receiver being jammed is introduced into the system at the radar antenna.

At present there is little a radar operator can do to combat high power noise once it is allowed to enter the receiver. The effect is the same as if there were a degradation in the receiver signal-to-noise ratio. Several well known ECM or jamming techniques such as spot jamming and mirage jamming are serious threats to effective radar operation. The only countermeasure presently available for the above-discussed jamming techniques is an increase in the directionality of the antenna used in the radar system.

SUMMARY OF THE INVENTION

The instant invention counteracts confusion type countermeasure techniques by allowing the operator to effectively determine the range of a relatively stationary target on a P type or B type radar system display. By use of a two layer barrier separated cathode ray tube screen in a radar system utilizing a P type or B type radar display, a workable distinction between jamming signals and stationary target echo signals is obtained. Determination of range and azimuth by the radar operator was not heretofore possible in the presence of spot jamming and mirage jamming techniques. However, with the use of the dual layer barrier separated cathode ray tube screen, a radar system operator can function effectively in the presence of confusion type ECM techniques.

OBJECTS OF THE INVENTION

An object of the present invention is to provide a functional radar display of a target even though random interference signals are introduced at the antenna.

Another object of the present invention is to provide a functional radar display of a fairly stationary target while confusion type of ECM techniques are being employed against the radar system.

A further object of this invention is to provide a functional radar display of a fairly stationary target having a water background.

A still further object of the present invention is to provide a pulse position indicator or B type display for a fairly stationary target that permits obtaining accurate range data even while wide band noise is being introduced into the receiver by ECM techniques.

Other objects, advantages and novel features of the invention will become apparent from the following detailed description of the invention when considered in conjunction with the accompanying drawings.

BRIEF DESCRIPTION OF THE DRAWING

FIG. 1 illustrates a well known radar system which utilizes a CRT display for indicating a target by means of polar coordinates; and FIG. 2 illustrates in cross-section the particular type of two-layer barrier separated screen for a cathode ray tube utilized in the instant invention.

DESCRIPTION OF THE PREFERRED EMBODIMENTS

As is evident to a person of ordinary skill in the art, FIG. 1 illustrates a radar system designed to render a P type or B type target display. If the CRT of FIG. 1 is replaced by a CRT of the type shown in FIG. 2, the combination would then serve as an effective counter-countermeasure system that could function to determine range and azimuth readings in the presence of a broadband confusion type ECM techniques. The ability to distinguish between jamming signals and the desired target signals is inherent in the structure of the cathode ray tube screen. It functions to this end when the antenna is focused on a relatively stationary target.

Referring now to FIG. 2 which is a cross-section of a CRT having a screen of the desired characteristics, attention is drawn to the two types of electron beams impinging on the screen. Because of the inherent quality of white gaussion noise, the electron beam generated, due to this gaussion noise, will be intermittent. The electron beam generated by the target echo signals, however, will have a persistence or time duration which is relatively long compared to the electron beam generated by the random noise signals.

The screen of the cathode ray tube is composed of two luminescent layers separated by a barrier of silicon dioxide or fritted glass. The physical characteristics of this barrier are such that it passes light energy and ultraviolet energy but does not pass electrons impinging on the inner layer of the screen. Inner layer 1 of the cathode ray tube screen is composed of a mixture of P16 and P19 or P22R phosphorus material which has the characteristics of a short build-up and decay time and fluoresces in a red color in response to an electron beam impinging on it. It also emits ultraviolet light rays when struck by an electron beam. Outer layer 3 of the cathode ray tube screen is composed of P22 phosphorus material which has a characteristic long build-up and decay time and fluoresces in a green color when excited by ultraviolet light rays.

When a persistent electron beam 4 impinges on layer 1 of the cathode ray tube screen, layer 1 emits ultraviolet light rays and red light rays. The red light rays pass through barrier 2 and layer 3. The ultraviolet light rays pass through barrier 2 and impinge on layer 3 causing it to emit green light rays since the electron stream is persistent and of long time duration as compared to intermittent electron beam 5. The viewer will perceive a white indication because of the mixture of red and green light rays at the face of the tube.

The intermittent electron beam 5 is generated by random intermittent noise signals. As this beam impinges on layer 1, red light rays and ultraviolet light rays are generated. Both pass through barrier 2 impinging on and passing through layer 3. The ultraviolet light rays, however, are of insufficient energy, because of the intermittent nature of the electron beam, to cause layer 3 to fluoresce in a green color. Therefore, only a red color appears to the viewer.

The viewer can thus readily distinguish between the red appearing interference signals and the white appearing target echo signals that he is viewing.

When an airplane radar system is viewing a fairly stationary water vehicle on a vast expanse of water, the radar signals transmitted to intercept the target are not only reflected from the target but are also reflected from the water. These water reflected signals enter the receiver as random interference signals and cause a complete noise erasure of the target. Using the tube illustrated in FIG. 2, however, allows the water vehicle to be viewed in a white color, whereas the echo signals from the surrounding water background will be indicated in red. As can be seen therefor, the invention may be used to detect a fairly stationary target in the presence of either ECM techniques or a fairly stationary target which has a water background.

Obviously many modifications and variations of the present invention are possible in the light of the above teachings.

What is claimed is:

1. A radar system utilizing a cathode ray tube for a polar coordinate display wherein said cathode ray tube comprises:

means for visually indicating the presence of a desired target;

means for determining the range and azimuth of said desired target in the presence of radar jamming signals;

said target indicating and range and azimuth determining means comprising an electron energy source, a first luminescent screen of wholly short persistence phosphorus material so disposed as to be activated by said electron energy source to fluoresce in a first color and emit ultraviolet energy rays, a second luminescent screen of wholly long persistence phosphorus material positioned in a cascade relationship with respect to said first screen and so disposed as to be activated by said ultraviolet energy rays to fluoresce in a second color distinct from said first color when the energy of the ultraviolet rays exceeds a minimum intensity and barrier means separating said cascaded first and second screens for permitting the passage of ultraviolet and other light energies and for barring the passage of electron energy such that radar jamming signals are visually displayed in said first color and the desired target signal is visually displayed in another distinctive color which is the result of a mixture of said first and said second colors.

* * * * *